UNITED STATES PATENT OFFICE.

HENRY LIONAL SHAWCROSS, OF NEW BRIGHTON, ENGLAND.

PROCESS OF MAKING NEGATIVE OR POSITIVE PLATES.

1,020,886.

Specification of Letters Patent.

Patented Mar. 24, 1914.

No Drawing.

Application filed May 3, 1907. Serial No. 372,583.

*To all whom it may concern:*

Be it known that I, HENRY LIONAL SHAWCROSS, a subject of the King of England, residing at New Brighton, in the county of Chester, England, have invented new and useful Improvements in Processes of Making Negative or Positive Plates, of which the following is a specification.

This invention has for its object the manufacture, application, subsequent treatment and use of a photo sensitive ferric film, on the surface of paper or other suitable material, as a substitute for the chrome film in process photography, or in the production of photographs in pigments or in transfer or printers' inks for use in photography, or in the various processes of photo-mechanical printing.

The invention is based upon, and utilizes an as yet unrecognized and unused property of a photo ferric film, namely its power of being dissolved by, or of absorbing certain of the cyanids while remaining insoluble in water. A photo sensitive colloidal ferric film is not only stained or dyed blue by the action of the water solution of potassium ferrocyanid before being reduced by the action of light, but it combines with it to form a soluble Prussian blue, and absorbs it or is permeated or dissolved by it, more or less, according as light has acted on it.

Under my invention I coat the surface of paper or any suitable material upon which it is desired to produce a photographic impression with a solution constituted so as to form a photo sensitive ferric film according to any of the well known formulæ now used for the blue line copying process, and consisting essentially of an organic thickening substance, preferably gelatin or gum, a ferric salt, and an organic or other weak acid. I have found however that this film is not immune to the penetrating powers of spirit colors, pigments, or fatty inks, dyes, varnishes, or enamels, which I make use of in subsequent operations. And to enable the dry film, more particularly when gum arabic is used as a thickener, to withstand the penetrating powers of these substances, I add a large proportion, say 12 per cent. or more, of alcohol or other suitable spirit solvent of the various gums or resinous impurities which may be present in suspension in the water gum solution, and I thereby produce a more perfect solution, and a more uniform and homogeneous film, which will resist the penetration of spirit or turpentine or fatty pigments, and will, on the removal of the film, produce a perfectly white ground free from spotting, freckling or speckles all over as is the case with existing ferric films. And when paper is the bearer or substratum used to carry the ferric film as a support to a pigment or to transfer or printers' inks, I prefer to use a paper already provided with a hard enameled inert and impervious "metallic" surface of sulfate of barium, generally known as "baryta" paper, which, from its powers of resisting absorption of the photo ferric solution, permits of a minimum thickness of colloidal substance being used, causes the film to remain on the surface, and enables it to wash off freely in subsequent operations; and it also serves to take and hold the pigments, dyes, stains, and particularly the greasy transfer inks on the surface, and to prevent their adhering to, or penetrating into the substance of the paper bearer.

The film is exposed to the action of light beneath a translucency in the usual way for such a time as shall render portions thereof on which the light has acted more or less impervious to, or insoluble in, a solution of potassium ferrocyanid. It may now be said to be "photo impressed", and is ready for application and use in photographic process work, according as it has been specially prepared, or as it is subsequently treated, as is indicated and in some cases described as follows: In the following descriptions, the words "positive" and "negative" are used in relation only to the original translucency. The photo impressed film, if on the surface of glass or other suitable material, may be treated with potassium ferrocyanid until the unexposed parts absorb same, and subsequently with greasy printers' ink which will attach itself only to the surface of the hard non-absorbent or exposed parts of the film in degree as the light has acted thereon, thus producing a continuous half-tone negative photo copy of the original. To obtain a photo negative copy with reversed lights and shades on the surface of the photo impressed film, on paper or other suitable material, it is inked up all over after exposure to light, and while quite dry, then the copy is immersed in a bath of potassium ferrocyanid, then the superfluous pigment or transfer or printers' ink on the absorbent or soluble unexposed parts will dissolve away, and should be removed. A negative photo copy of the translucency will result. The blue coloration induced in developing with the potassium ferrocyanid may be bleached or removed in a bath of potassium oxalate or any strong alkali. If a positive copy with direct lights and shades be required, then the photo-impressed film, which, in this case has been preferably prepared with a gum thickener, is first treated all over with the potassium ferrocyanid, by which means the portions under the dark parts, which would be under the lines of a translucent drawing, are dissolved completely away, being removed by flushing or rubbing in a water bath, until the surface of the paper or substratum is completely naked or bare in those parts. The print is now dried, and is treated all over with pigment inks, paints, dyes, stains, enamels or varnishes, or with greasy photo-litho transfer or printers' or other equivalent inks. By now immersing the copy in a weak acid bath, the gum or gelatin film still protecting the surface in the exposed parts, is dissolved, and by removing the same in a water bath, a pigmented positive copy remains direct upon the surface of the paper or substratum. And the same exposed film which already has given a negative copy as previously described may still be utilized if desired, to obtain a positive copy by completely dissolving away the unexposed parts of the film in the ferrocyanid bath in the first instance, and so leaving bare the surface of the paper in those parts, then drying and treating all over with pigment or greasy inks, then removing the exposed film in an acid bath all as described. Where gelatin has been used, it will be necessary to work with warm water, whereas where gum is the thickening substance, all operations can be conducted with cold water. Thus either positive or negative photo copy can be obtained in pigments or in transfer or printers' inks from the same translucency through the agency of the ferric film and the two solvents potassium ferrocyanid for the primary, and weak acid for the secondary, while the absorbent powers of the gum or gelatin for the water solution of potassium ferrocyanid, are availed of to make the copy of service in photographic process printing work just as chrome salts and water are now used.

What is claimed is:—

1. In a photographic process subjecting to the action of potassium ferrocyanid a sensitive colloidal film carried on the surface of a suitable material and which has been exposed to light beneath a translucency and thereby rendering solvent the unexposed parts of said light impressed colloidal film, substantially, as set forth.

2. In a photographic process subjecting to the action of potassium ferrocyanid a sensitive colloidal film carried on the surface of a suitable material and which has been exposed to light beneath a translucency thereby rendering solvent the unexposed portions of the light impressed colloidal film and subsequently removing these unexposed portions of the film.

3. In a photographic process subjecting to the action of potassium ferrocyanid a sensitive colloidal film carried on the surface of a suitable material and which has been exposed to light beneath a lined, grained, or stippled translucency, and has had applied to the surface a pigment or transfer or printers' ink, for rendering solvent the unexposed parts of said light impressed colloidal film and removing the superfluous pigment or ink with the soluble unexposed parts.

4. In a photographic process subjecting to the action of potassium ferrocyanid a sensitive colloidal film carried on the surface of a suitable material and which has been exposed to light beneath a translucency, thereby rendering solvent the unexposed parts of said light impressed colloidal film, and removing the unexposed parts of the film by water until the surface of the material is bare in those parts.

5. In a photographic process subjecting to the action of potassium ferrocyanid a sensitive colloidal film carried on a hard inert impervious surface of a suitable material, and which has been exposed to light beneath a translucency and thereby rendering solvent the unexposed parts of said light impressed colloidal film.

6. In a photographic process, subjecting to the action of potassium ferrocyanid a sensitive colloidal film carried on a baryta surface, and which has been exposed to light beneath a translucency, and thereby rendering solvent the unexposed parts of said light impressed colloidal film; and subsequently removing the unexposed portions.

In testimony whereof I have signed my name to this specification in the presence of two subscribing witnesses.

HENRY LIONAL SHAWCROSS.

Witnesses:
S. GOODALL,
ANDREW TAYLOR.